United States Patent [19]

Atkin

[11] 4,296,934
[45] Oct. 27, 1981

[54] SEALING ASSEMBLY

[75] Inventor: Howard S. Atkin, Leeds, England

[73] Assignee: Holset Engineering Company Limited, Huddersfield, England

[21] Appl. No.: 46,409

[22] Filed: Jun. 7, 1979

[30] Foreign Application Priority Data

Jun. 9, 1978 [GB] United Kingdom ............ 26635/78

[51] Int. Cl.³ ................. F16J 15/34; F16J 15/46
[52] U.S. Cl. ................. 277/81 R; 277/53; 277/27; 277/134; 415/113
[58] Field of Search .............. 277/3, 27, 53, 54, 83, 277/95, 133, 173, 174, 134, 177, 190, 191, 216, 188 R, 188 A; 415/110, 111, 113

[56] References Cited

U.S. PATENT DOCUMENTS

| 2,087,313 | 7/1937 | Bigelow et al. | 277/27 |
| 2,759,778 | 8/1956 | Anderson | 277/53 X |
| 3,104,594 | 9/1963 | Reiners | 92/227 |
| 3,565,497 | 2/1971 | Miller | 277/53 X |
| 3,743,303 | 7/1973 | Pope | 277/173 X |
| 3,887,198 | 6/1975 | McClure et al. | 277/27 |
| 3,917,288 | 11/1975 | Huber et al. | 277/133 X |
| 4,198,063 | 4/1980 | Shimizu et al. | 277/133 X |

FOREIGN PATENT DOCUMENTS

| 2239488 | 2/1974 | Fed. Rep. of Germany . |
| 1438780 | 4/1966 | France . |
| 1504821 | 10/1967 | France . |
| 1388682 | 3/1975 | United Kingdom . |

Primary Examiner—Robert S. Ward, Jr.
Attorney, Agent, or Firm—Gary M. Gron; Robert T. Ruff

[57] ABSTRACT

The disclosure illustrates having a turbocharger housing and a turbine wheel shaft rotatable relative to one another and in which one of the members has a cylindrical surface and the other member contains an annular groove, a sealing ring being located in the annular groove and engaging the cylindrical surface. One of the radially extending walls of the sealing ring includes a chamfered portion such that the axial dimension of the radially inner surface of the sealing ring is less than the axial dimension of the radially outer surface of the sealing ring, the annular groove including a complementary shaped wedging surface for cooperation with the chamfered surface of the sealing ring.

3 Claims, 4 Drawing Figures

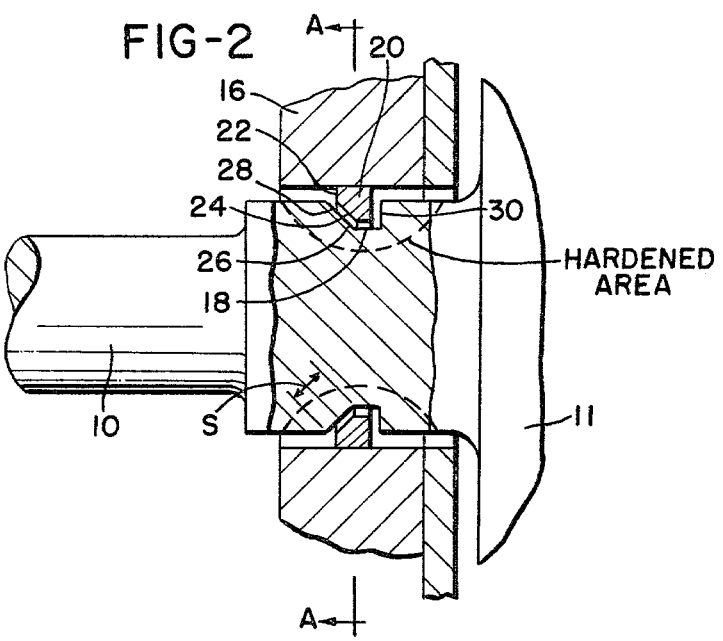
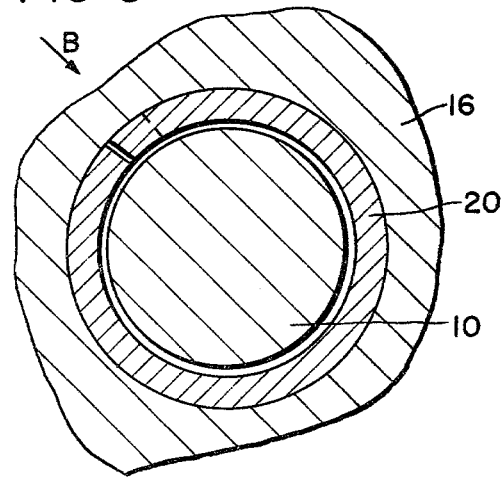
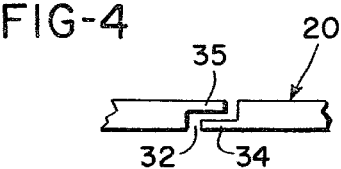

SEALING ASSEMBLY

The present invention relates to sealing assemblies comprising two members and a sealing ring located therebetween.

Various forms of sealing assemblies are known comprising two members, one of which has a cylindrical surface and the other of which has an annular groove therein, and a sealing ring disposed in the groove and engaging the cylindrical surface. Such constructions are well known where the two members are movable relative to one another. Such sealing assemblies are normally used where there is a pressure differential between the two sides of the sealing assembly which can result in gas or liquid being forced past the seal.

In conventional turbochargers using a single conventional sealing ring the amount of "blow-by" is quite heavy during exhaust brake operation and attempts have been made to solve this by either using two sealing rings or by using a stepped bore in the housing member. The first of these methods is, however, expensive in that two rings have to be provided and secondly two grooves have to be machined in the shaft. The latter method is expensive because of the extra machining of the housing. Such arrangements also result in wear on the grooves and the degree of sealing tends to decrease with wear. Normally shaft wear becomes intolerable long before wear occurs elsewhere and the shaft has to be replaced.

The problems of leakage are solved by a sealing assembly comprising a housing and a turbine wheel shaft rotatable relative to one another, one of which has a cylindrical surface and the other of which has an annular groove therein, and a sealing ring located in the annular groove and engaging the cylindrical surface. One of the radially extending walls of the sealing ring includes a chamfered portion such that the axial dimension of the radially inner surface of the sealing ring is less than the axial dimension of the radially outer surface of the sealing ring. The annular groove includes a complementary shaped wedging surface for cooperation with the chamfered surface of the sealing ring.

The invention will now be further described, by way of example, with reference to the accompanying drawings in which:

FIG. 2 is an enlarged scale cross-section of part of the assembly of FIG. 1 in the region of the sealing ring;

FIG. 3 is a cross-section along the line AA of FIG. 2; and

FIG. 4 is a detailed view of part of the arrangement of FIGS. 1 and 2 looking in the direction of the arrow B shown on FIG. 3.

Figure 1:
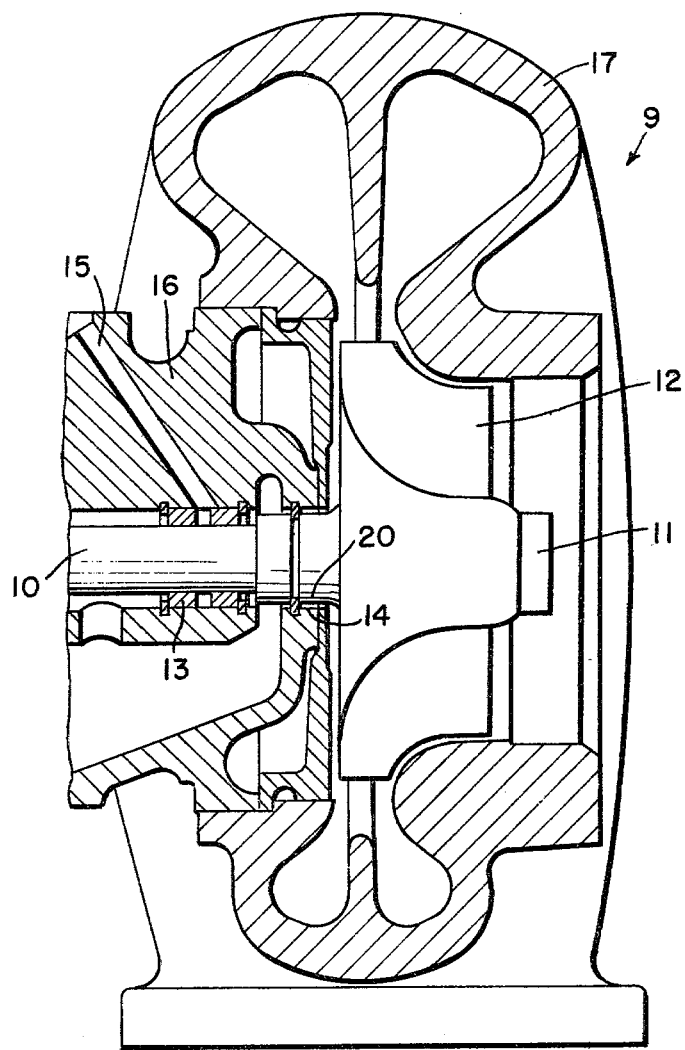
FIG. 1 is a cross-section of some portions of a turbocharger containing a sealing assembly in accordance with the present invention.

The sealing assembly of the present invention is applicable to all constructions comprising two members one of which has a cylindrical surface and which two members are movable relative to one another. The expression "movement relative to one another" is intended to include all forms of movement including rotational movement relative to one another and also reciprocating movement, relative to one another.

In a preferred embodiment however, this invention is illustrated in a sealing assembly comprising a rotatable shaft having an annular groove in which the sealing ring is located, at least that part of the shaft in which the groove is located being disposed within a cylindrical bore or aperture in a second member for example, a housing member.

Referring to the drawings there is shown a portion of the turbine end of a turbocharger 9. A rotatable shaft 10 upon which is mounted the turbine hub 11 and blades 12 of the turbine passes through a circular aperture 14 formed in the turbocharger housing 16.

A floating sleeve bearing assembly 13 is positioned within housing 16 to journal shaft 10. A passage 15 in housing 16 is connected to a supply of pressurized lubricating fluid to lubricate and cool the sleeve bearing 13. Hot gases are directed across the turbine blades 12 by a turbine housing 17, thus causing them to rotate the shaft 10. Shaft 10, in a typical arrangement, is connected to a compressor (not shown) which compresses air for delivery to the intake of an internal combustion engine. The products of combustion from that engine are delivered to the turbine housing 17 and across the blades 12.

A substantial quantity of lubricating liquid, and lubricating mist, is present in the region of aperture 14. It is necessary to prevent leakage of the lubricating fluid from housing 16 to the turbine under certain operating conditions because the fluid would be lost. Many turbochargers are used today in conjunction with an exhaust brake which plugs up the engine exhaust downstream of the turbine to slow a vehicle. This converts the engine into an air compressor with a blocked outlet and thus causes it to function as a brake. When this type of operation occurs, a substantial pressure differential occurs across aperture 14 with the high pressure side adjacent the turbine. This pressure is far greater than the normal pressure differential occurring across the seal. As a result, it is necessary to prevent excessive quantities of gas from flowing back into housing 16.

The above leakages are prevented in accordance with the present invention by the provision of a sealing ring 20 disposed in an annular groove in shaft 10. A part of one of the axial faces 22 of the sealing ring 20 is chamfered or angled at 24 and a cooperating cone-like wedging surface 26 is provided in one wall of the groove 18. The walls of the groove 18 are hardened at shoulders 28 and 30.

In operation, the turbine side of the sealing assembly is at a higher pressure than the other side and the sealing ring 20 is forced to the left (as viewed in FIG. 2) by this pressure differential. Cooperation between the surface 24 of the sealing ring and the surface 26 of the groove causes the sealing ring 20 to expand outwardly and thus to form an even better seal between itself and the turbine housing. It can also be seen from FIG. 2 that the area of contact between the sealing ring and the annular groove (indicated by S on FIG. 2) is greater than would be the case for a conventional sealing ring excluding the chamfered surface 24. In order to reduce the leakage which might be caused on circumferential expansion of the sealing ring as described above, the ring 20 contains a gap 32 (see FIG. 3) which is not a straight through gap but includes interfitting rectangular projections 34 and 36 to define two right angles and thus any fluid leaking through the gap must change direction twice.

The sealing ring may be constructed of any suitable material. If it is constructed of the conventional materials, e.g. cast-iron, then it is necessary to include a gap in the ring to allow assembly. In order to reduce the leakage which can be caused by such gaps, however, such gap is preferably not such as to provide a straight line path through the sealing ring. The ring may, however, be in accordance with the arrangement described in co-pending application No. 046,410 entitled Sealing Assembly, filed on June 7, 1979 in which case no such gap is necessary.

The sealing assembly of the present invention provides a number of advantages over conventional sealing assemblies which advantages are to a large extent due to the cooperation between the chamfered surface of the sealing ring and the cooperating wedging surface of the annular groove. The assembly is normally arranged such that the chamfered surface of the sealing ring and also the wedging surface of the annular groove are at the lower pressure side of the sealing assembly. The pressure differential will thus cause the chamfered surface of the sealing ring to cooperate with the wedging surface of the annular groove thereby forcing the sealing ring into even closer cooperation with the cylindrical surface. A second advantage also arising from the cooperation between the chamfered surface and the wedging surface is that the degree of contact at this point is greater for a ring of the same radial thickness but excluding the chamfered surface and the wedging surface.

By utilizing the present invention the ring cost is lower than using twin rings, used in prior art designs, and there is no need for extra machining of the bearing housing as in the stepped bore arrangement. By induction hardening of the parts of the annular groove which contact the sealing ring the shaft wear is reduced.

The shape of the angled groove and the chamfered ring face increases the area of contact and thus the degree of sealing during the periods when the exhaust brake is on. In addition, the increased contact area minimizes unit pressure during sudden application of the exhaust brake and thereby minimizes wear.

The wearing forces are reduced by approximately a factor of two and the life of the ring and the shaft are thus increased. Tests carried out to compare a sealing assembly of the present invention with a conventional sealing assembly have shown that blow-by in a conventional sealing assembly is approximately 25 cubic feet per hour whereas the blow-by in the arrangement of the present invention is not measurable. A generally axially wider ring may be used in the present invention thereby further increasing the sealing. Sealing is furthermore increased by cooperation of the chamfered surface of the sealing ring with the wedging surface of the annular groove.

It is thus generally possible to use inexpensive sintered sealing rings at the turbine end of a turbocompressor without sacrificing wall pressure.

Conventional sealing rings, normally used between the shaft and the housing at the turbine end of a turbocharger, are sized so that they have an interference fit in the bore of the housing to prevent leakage between the ring and the housing bore. High quality and expensive heat resistant ferrous materials are normally used for such rings to delay any relaxation of the rings resulting from continued operation at elevated temperatures and consequent loss of sealing between the ring and the housing bore. With the present invention, the differential pressure which exists between the turbine casing and the housing bore urges the chamfered surface of the ring against the wedging surface of the annular groove and maintains the ring in sealing contact with the housing bore. The use of expensive, high quality heat resistant irons is thus not necessary and relatively cheap sintered iron rings may be used.

While a preferred embodiment of the present invention has been described, it should be apparent that it may be practiced in other than the illustrated form without departing from its spirit and scope.

Having thus described the invention, what is claimed as novel and desired to be secured by Letters Patent of the United States is:

1. A turbine assembly comprising:
   a turbine housing having an internal cylindrical surface;
   a turbine wheel shaft rotatable relative to said housing and having an external cylindrical surface opposing the internal cylindrical surface, said turbine wheel shaft having an annular groove formed therein;
   a sealing ring positioned in said annular groove and having a cylindrical radially outer surface engaging the cylindrical surface of said turbine housing;
   one of the axial faces of said sealing ring having a chamfered portion so that the axial dimension of the radially inner surface of the sealing ring is less than the axial dimension of the cylindrical radially outer surface of the sealing ring, the annular groove including a complementary shaped cone-like wedging surface for cooperating engagement with the chamfered surface of the sealing ring.

2. A sealing assembly as in claim 1 wherein the sealing ring is split and has overlapped ends.

3. A sealing assembly as in claim 1 wherein the cylindrical surface in which said annular groove is formed and the area surrounding said groove is hardened relative to the remainder of said member.

* * * * *